United States Patent
Farhady et al.

(10) Patent No.: US 10,880,328 B2
(45) Date of Patent: Dec. 29, 2020

(54) MALWARE DETECTION

(71) Applicant: ACCENTURE GLOBAL SOLUTIONS LIMITED, Dublin (IE)

(72) Inventors: Nahid Farhady, Falls Church, VA (US); Malek Ben Salem, Falls Church, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 284 days.

(21) Appl. No.: 16/193,956

(22) Filed: Nov. 16, 2018

(65) Prior Publication Data

US 2020/0162483 A1    May 21, 2020

(51) Int. Cl.
*H04L 29/06* (2006.01)
*G06F 21/56* (2013.01)
*G06N 3/04* (2006.01)
*G06N 3/08* (2006.01)

(52) U.S. Cl.
CPC .......... *H04L 63/145* (2013.01); *G06F 21/566* (2013.01); *G06N 3/04* (2013.01); *G06N 3/08* (2013.01); *G06F 2221/033* (2013.01)

(58) Field of Classification Search
CPC . H04L 63/145; H04L 63/1433; G06F 21/566; G06F 2221/033; G06F 21/562; G06F 21/561; G06N 3/04; G06N 3/08; G06N 3/0427
See application file for complete search history.

(56) References Cited

U.S. PATENT DOCUMENTS

| | | | | |
|---|---|---|---|---|
| 7,818,797 | B1 * | 10/2010 | Fan | H04L 63/1425 726/22 |
| 9,294,498 | B1 * | 3/2016 | Yampolskiy | G06F 21/56 |
| 9,485,272 | B1 * | 11/2016 | Roundy | G06F 21/56 |
| 10,133,865 | B1 * | 11/2018 | Feinman | G06N 3/0454 |
| 2012/0084859 | A1 | 4/2012 | Radinsky et al. | |
| 2014/0090061 | A1 * | 3/2014 | Avasarala | G06F 21/56 726/24 |
| 2014/0123289 | A1 | 5/2014 | Hsiao et al. | |
| 2015/0101050 | A1 * | 4/2015 | Nielson | G06F 21/552 726/23 |

(Continued)

FOREIGN PATENT DOCUMENTS

KR    101863615 B1    6/2018

*Primary Examiner* — Darren B Schwartz
(74) *Attorney, Agent, or Firm* — Mannava & Kang, P.C.

(57) ABSTRACT

Examples of malware detection are provided. In an example, to detect malwares, a first subset of features may be determined from a binary file. The binary file may be analyzed based on machine learning model to determine a category of malware, which is based on a degree of detectability of the category. A first category may have a lower detectability of malware in the binary file and a second category may have a higher detectability than the first. A model may then be created to analyze the first category of malware and an analysis of the binary may be performed. The analysis may be performed using the model. Thereafter, a confidence score may be generated for the binary file. The confidence score may be indicative of certainty of determining whether the binary file is goodware or includes malware. Malware may be detected upon the confidence score exceeding a threshold value.

20 Claims, 9 Drawing Sheets

(56) References Cited

U.S. PATENT DOCUMENTS

| | | | |
|---|---|---|---|
| 2015/0227741 A1* | 8/2015 | Permeh | G06F 21/52 |
| | | | 726/22 |
| 2016/0381042 A1* | 12/2016 | Zhang | H04L 63/1416 |
| | | | 726/24 |
| 2017/0004306 A1 | 1/2017 | Zhang et al. | |
| 2018/0053105 A1* | 2/2018 | Paul | G06N 3/0454 |
| 2018/0077180 A1* | 3/2018 | Zhang | G06F 21/566 |
| 2018/0139178 A1* | 5/2018 | Gan | G06F 21/552 |
| 2019/0163900 A1* | 5/2019 | Zhang | G06F 21/567 |
| 2019/0163904 A1* | 5/2019 | Chung | G06N 3/084 |

* cited by examiner

MALWARE DETECTION

BACKGROUND

A large number of devices such as, for example, mobile devices, laptops, computers, personal digital assistants may be connected to the Internet to allow accessing and sharing of online content by users across the world. The users can connect to the Internet and other devices to download and share online content of their choice. Furthermore, the users have flexibility of accessing a variety of websites and online sources from any location that has connectivity to the Internet.

The flexibility and ease of connecting to the Internet has increased downloading of online content from many untrustworthy sources on the Internet. There has also been a constant rise in the volume of unsolicited emails received by users from unknown sources. In addition, the devices communicating over the Internet may be vulnerable to security attacks owing to downloading of online content from untrustworthy sources or due to the unsolicited emails. For example, malwares in online content such as, for example, emails, may cause the theft of personal and confidential user data, which may be misused. For example stolen personal data may be used to conduct online fraudulent activities. Malwares may also affect a large number of connected devices of an organization, and block such devices from the Internet thereby impacting the overall functioning of the organization.

With the increase in the volume of online content available to uses, malware related issues have also increased proportionally and are likely to increase in the future as well. Existing malware detection systems usually detect a malware that is already known, based on data available regarding existing malwares. In such systems, when a new code with the same malware is received, malware may be detected in the new code based on a similarity of the new code with the known malwares.

However, in many cases, when codes have new malwares or malwares that are not similar to known and stored malwares, the process of discovering such malwares and training the existing malware detection systems to detect such malwares becomes lengthy, time consuming and expensive. Additionally, the existing malware detection systems may not be efficient and quick in detecting large volume of malwares with accuracy. The training of the existing malware detection systems may require manual intervention for providing inputs and data associated with the new malware. The inputs and data may allow the existing malware detection systems to learn about the new malwares and detect the new malwares in codes. However, during this time period, any malware that remains undetected, may make devices, such as connected devices of an organization, prone to security attacks.

The present disclosure provides a technical solution to a problem to efficiently and quickly detect malwares in online content and provide for efficient learning and training of the existing malware detection systems to improve operational costs of such systems.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element and can include one or more of such elements. As used herein, the term "includes" means includes but not limited to, the term "including" means including but not limited to. The term "based on" means based at least in part on, the term "based upon" means based at least in part upon, and the term "such as" means such as but not limited to.

The present disclosure describes systems and methods for detecting malware in a fast and efficient manner. Malware may be included within codes associated with online content or shared content, and may be downloaded or stored on to a host device when connected to the Internet. In an example embodiment, malware may be set of instructions that may run on the host device and perform operations without the permission or knowledge of the user of the host device. The operations may include, for example, stealing personal information of the user, use device resources and delete files of the host device.

Broadly, malwares may be categorized into cybercrimes and cyber espionage. Cybercrimes may refer to operations of malwares that include unauthorized use of tools, resources and telecommunication networks in order to commit crimes and fraudulent activities for financial gains. Cyber espionage may have malicious intent other than financial gains and may refer to operations that include exploitation of devices to steal industrial, military, and political information of adversarial defense networks and industrial infrastructure.

The present disclosure provides a hierarchical approach of detecting malware in a data file having a code or a computer program and, thereafter, categorizing the malware into one of cybercrime and cyber espionage. In addition to detection of malwares, the present disclosure provides for efficiently training systems for the detection of malwares.

According to an aspect of the present disclosure, the data file, such as a binary file may be analyzed. The binary file includes bits of computer readable instructions representing the code or the computer program to perform various operations. In addition, the binary file may include, tokens, instructions and basic blocks of the codes. In an example, the multiple bits, bytes, tokens, instructions and basic blocks in the codes may be referred to as features of the binary file.

For detecting malware, a first subset of features may be determined from amongst features of the binary file. For instance, if there are forty features in the binary file, then fifteen features that are most relevant for detecting malware may be selected as the first subset of features The first subset of features, in an example, may be determined based on a relevance of detecting malware based on consulting with an engineer regarding data related to the first subset of features. The data may then be provided to a Machine Learning (ML) engine to obtain results and feedback regarding the first subset of features and update the first subset of features. For example, data regarding entropy and size may be received and then data related to number of sections may be added to the data. Thereafter, a machine learning technique, for instance, Term's Frequency (TF) and its Inverse Document Frequency (TF-IDF) method may be applied on Dynamic Link Library (DLL) imports and functions to update the first subset of features.

In another example, a feature ranking technique may be used to determine the first subset of features. For ranking, a set of features may be provided to a ML technique, to receive ranked features based on effectiveness in detecting malware.

The first subset of features may be provided to a machine learning model. The machine learning model, may be trained based on previous malwares and bit patterns within previous binary files, such that the machine learning model may detect bit patterns indicative of malwares in other binary files. Thereafter, a category of malware may be determined for the binary file based on the machine learning model. The category may be defined based on a degree of detectability of a malware. For instance, a category may correspond to cybercrimes, which may have a high detectability and may be easily detected based on further analysis of the binary file. Another category may correspond to cyberespionages, which may have a lower detectability as the code may be written in a deceptive manner so to appear as a good ware and, therefore, may be difficult to detect. In an example, the cyber espionage may be referred to as a first category of malware and the cybercrimes may be referred to as a second category of malware. One or ordinary skill in the art will appreciate that in other examples, the categories may be defined differently or based on other parameters. However, the principles of the present disclosure may be applied for category detection albeit certain variations.

In an example, a model may be created to analyze the first category of malware. The model may be, for instance, a deep learning model that may be utilized to perform analysis of the first category of malware. The first category of malware may be analysed based on a second subset of features, providing further information regarding the malware to provide for accurate detection of potential malwares. The second subset of features may be extracted from amongst the multiple features of the binary file and may be different from the first subset of features. In an example, the second subset of features may be detected based on their relevance in determining malware. In an example, the second subset of features may be determined in a similar manner as the first subset of features described earlier. The second subset of features may include, for instance, crypto-primitives that are used in malware, Program Database (.pdb) strings, Uniform Resource Locator (URL) domain and static Internet Protocol (IP) addresses.

Thereafter, a confidence score may be generated for the binary file. The confidence score may be indicative of certainty of the analysis performed on the binary file for detection of malware and may be determined based on techniques, such as classification analysis and validation datasets. The confidence score may be compared with a threshold to determine presence of a particular type of malware. For instance, if the confidence score is higher, then the analysis may be able to accurately determine whether the binary file has malware or goodware. Upon determining presence of malware, the binary file may be analyzed further to determine the type of malware, based on a clustering technique.

In another example, when the confidence score is below the threshold then the binary file may further analyzed to ensure accuracy of detecting the malware. Such further analysis may be performed on another subset of features, referred to as third subset of features obtained from the binary file. The third subset of features may be determined based on runtime execution of the code and may be more relevant than the first subset of features and the second subset of features for determining malware. The third subset of features may be extracted after the first subset of features and the second subset of features, as extracting the third subset may be expensive and time consuming. The extraction may require dynamic analysis, running the malware in a sandbox, and extracting values from hardware. The first subset of features and the second subset of features are static, and may be extracted by analyzing a raw binary file, without requiring execution of the binary file having malware.

In an example, the third subset of features may be determined based on a training dataset that includes malwares and associated classes. For each class of malware, features that are more effective may be determined using the ML technique. The third subset of features may include, for instance, branch instructions, such as Instruction Translation Lookaside Buffer (iTLB) Load misses, Data Translation Lookaside Buffer (dTLB) store misses, Cache misses, dTLB stores, and L1 icache load misses. The values of the features may be used to determine which class of malware uses the features. Based on the further analysis, the type of malware may be detected.

In an example, clustering techniques may be implemented to analyze the second category of malware and detect various malwares. A Convolutional Neural Network (CNN) may be utilized for classification and detection of the second category of malware. Upon detection of malware, belonging to first category or second category, a suitable remedial action may be performed.

Thus, malware detection systems, which use techniques consistent with the present disclosure may efficiently categorize malware present in a binary file and then, based on the category, select a process to quickly detect malware. The present disclosure provides provide time-efficient malware detection techniques, which are reliable and accurate.

Figure 1:
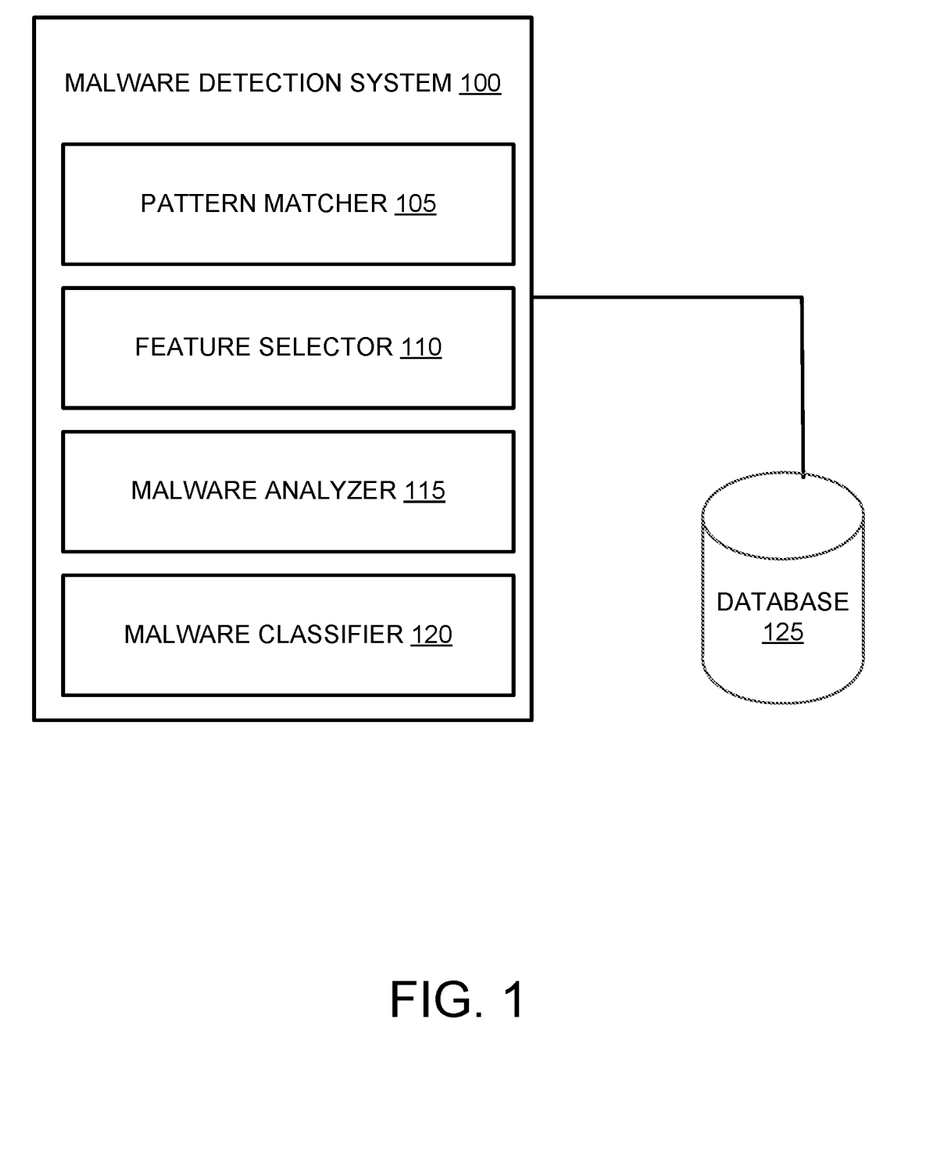
FIG. 1 illustrates various components of a malware detection system, according to an example embodiment of the present disclosure.

FIG. 1 illustrates a malware detection system 100 for detecting malwares present in a binary file, according to an example embodiment of the present disclosure. In an example embodiment, malware detection system 100, hereinafter referred to as system 100, uses a combination of Artificial Intelligence (AI) techniques, such as machine learning, data mining, and knowledge discovery, for the purpose of detecting malware in binary files of codes.

In an example, the system 100, amongst other components, may include a pattern matcher 105, a feature selector 110, a malware analyzer 115, and a malware classifier 120. The system 100 may be communicatively coupled to a database 125.

The system 100 provides for a hierarchical approach of detecting malware in a data file having a code or a computer program and, thereafter, categorizing the malware into one of cybercrime and cyber espionage. The relevant technique may then be applied on the code to detect malware present in the code. The hierarchical approach provides high speed of detection of malwares with high accuracy and reliability. The high speed of detection and accuracy may be achieved based on utilizing fewer features or a limited number of features that are most relevant for detecting malware in the code as against using an entire feature set of the binary file.

In an example embodiment of the present disclosure, the pattern matcher 105 may receive a binary file that is indicative of the code. The binary file may include bits and bytes of binary digits that may be aligned in one or more patterns, referred to as bit patterns, to represent instructions of the code. In an example, the pattern matcher 105 may access the database 125 that includes stored bit patterns of previous binary files. The pattern matcher 105 may compare the bit patterns in the binary file with the stored bit patterns in the database 125 to determine if there is a match. If the bit patterns of the binary file match with any of the stored bit patterns, then malware associated with the stored bit pattern may be identified to be malware present in the binary file.

In an example, if there is no match, the feature selector 110 may select a first subset of features from the binary file. The first subset of features may be selected based on relevance of the features in detecting malware. For instance, the subset of features may include information or data that is indicative of presence of malware in the binary file.

After selecting the first subset of features, the malware analyzer 115 may apply a machine learning model based on the first subset of the features to determine a category of malware. In one example, the category may either be cybercrime or cyber espionage. The malware classifier 120 may create a model for further analysis of the binary file to determine the type of malware present or to confirm whether the binary file is a good ware. Thereafter, the feature selector 110 may select a second subset of the features.

The malware classifier 120 may analyze the category of malware based on the model and the second subset of the features. The malware classifier 120 may determine a confidence score based on the analysis. The confidence score may be indicative of certainty of the analysis performed on the binary file for detection of malware. The confidence score may be compared with a threshold, for instance, 70%, to determine if the confidence score is high or low. A high confidence score may be indicative of a high degree of certainty about detection of malware, while a low confidence score may be indicative of a lower certainty about the detection. Thereafter, the malware classifier 120 may determine the type of malware present in the binary file. The working of the system 100 with respect to additional components is explained in detail below.

Figure 2:
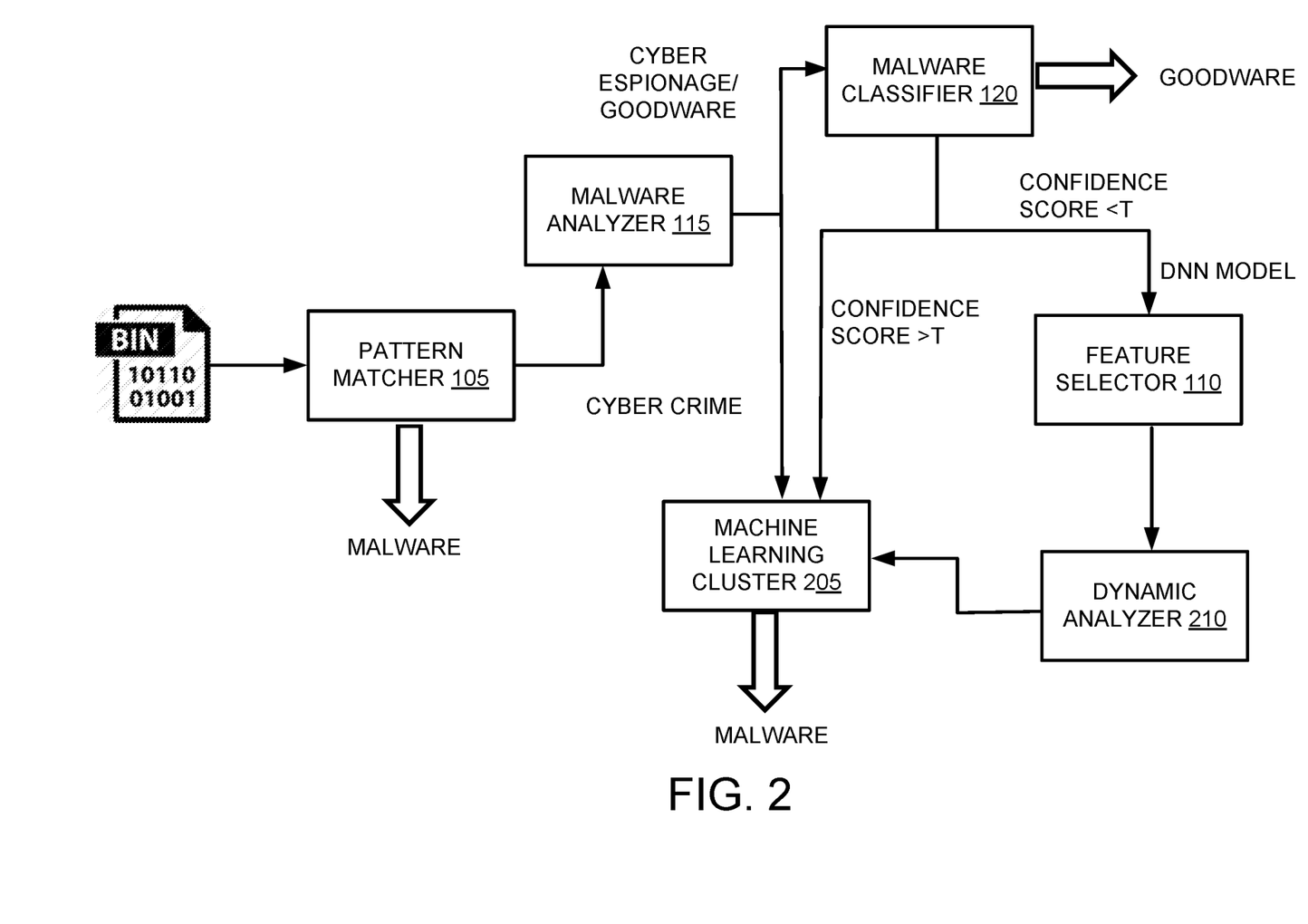
FIG. 2 illustrates a malware detection system, according to an example embodiment of the present disclosure.

FIG. 2 illustrates the working of the malware detection system 100 in FIG. 1 with additional components, according to an example embodiment of the present disclosure. The pattern matcher 105 may receive the binary file. Upon receiving the binary file, the pattern matcher 105 may compare the binary file with the stored bit patterns in the database 125. In an example, the database 125 may store bit patterns from previous binary files that may have been detected to be associated with malwares. For instance, a bit pattern may have been associated with a trojan malware. Similarly another bit pattern may be associated with a backdoor malware. The pattern matcher 105 may compare the bit patterns in the binary file with the stored bit patterns in the database 125 to detect a similarity. The pattern matcher 105 may perform the comparison based on multiple techniques such as, for instance, matching based on Yara rules. Such techniques, however, may not be efficient in detecting all type of malwares. For instance, packers, mutation engines and obfuscation may not be detected by the techniques.

Based on the comparison, the pattern matcher 105 may determine if there is malware in the binary file. In a case, when there is no match then the binary file may be forwarded to the malware analyzer 115. The malware analyzer 115 may apply a machine learning model to the binary file to determine if there are malwares in the binary file based on a first subset of features of the binary file. There may be several machine learning techniques, such as decision trees, random forest algorithms, Support Vector Machine (SVM), Convolutional Neural Network in deep learning that may be applied to determine malwares. The first subset of features may be selected from features such as static features and runtime features. The static features may include bytes, tokens, instructions, basic blocks, Control Flow Graphs (CFG) and Call Graph (CG). The runtime features, also referred to as dynamic features, may include system calls, Application Programming Interface (API) calls, and system object dynamics.

In an example, the first subset of features may be selected by extracting functions by profiling malwares and goodwares. Malwares and the goodwares may be profiled based on previous binary files. Thereafter, a dictionary may be created for the functions. The dictionary may then be sorted based on the frequency of malwares and goodwares. After sorting, the top few functions may be selected as the first subset of features.

In an example, the malware analyzer 115 may determine a Shannon entropy for the binary file. The Shannon entropy may be indicative of repetition of bit patterns within the binary file. The Shannon entropy may be calculated based on a Shannon entropy equation.

Based on the Shannon entropy, malware present in the binary file may be categorized into separate categories, for instance, a first category and a second category. In an example, when the binary file has low Shannon entropy, malware may be categorized into a first category and when Shannon entropy is high, the binary file may be categorized into a second category. In an example, the categories may also be determined based on ease of detecting malwares. The first category may be for cybercrimes that may be difficult to detect and the second category, may be for cyber espionages that are easier to detect. In an example, the machine learning cluster 205 may apply a clustering technique on the second category of malwares to detect the type of malware present in the binary file.

In an example embodiment of the present disclosure, the first category may be of cyber espionage and the second category may be for cybercrimes. The cyber espionage may refer to malwares that exploit systems such as computers, mobile devices and other user devices to steal industrial, military, and political information. Further, such malwares may steal information regarding security of adversary defence networks and industrial infrastructure. Malwares under cybercrimes may use IT tools and telecommunication networks in order to commit crimes in different manners such as, for example, stealing personal information and conducting fraudulent transactions.

Figure 3:
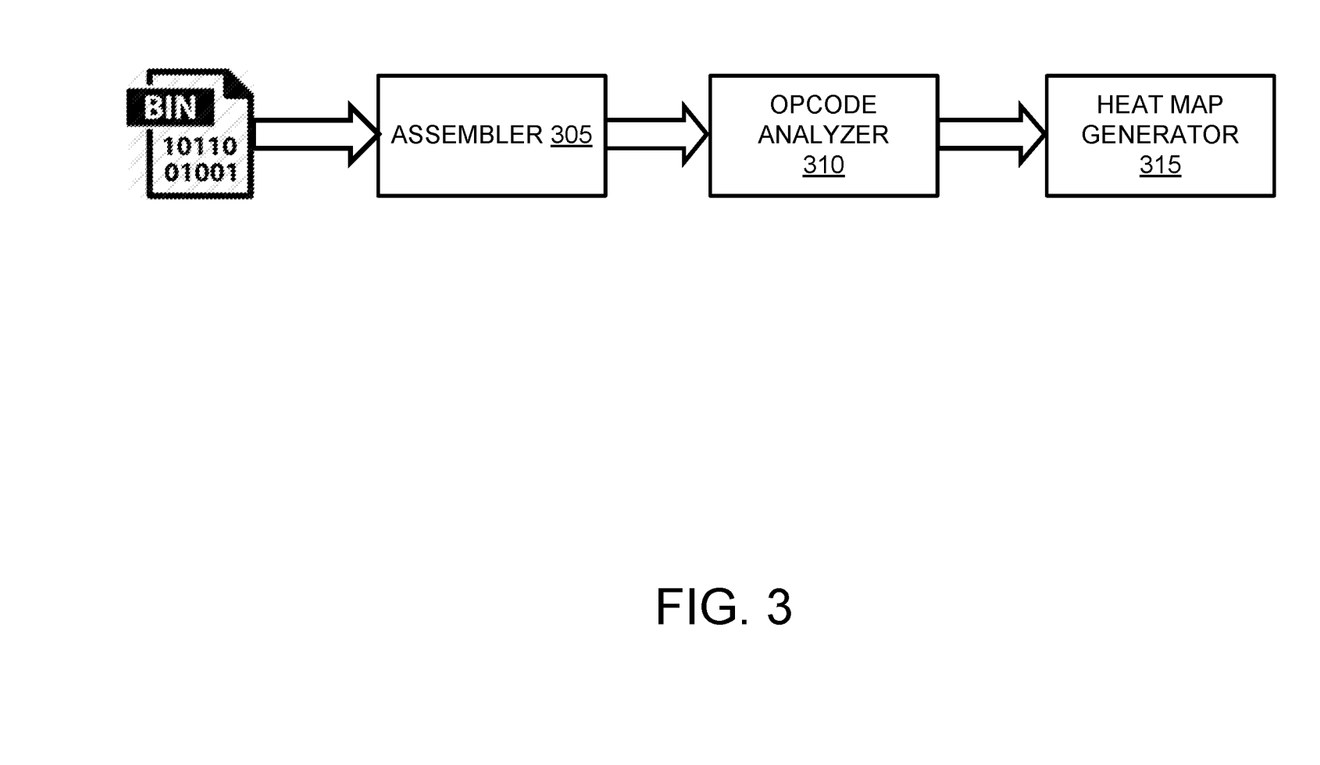
FIG. 3 illustrates components of a malware detection system for generating a heat map, according to an example embodiment of the present disclosure.

In an example, when the Shannon entropy is low then a heat map may be generated. FIG. 3 illustrates an example depicting generation of the heat map. In an example, the binary file may be provided to an assembler 305. The assembler 305 may determine the opcode for the binary file. Thereafter, an opcode analyzer 310 may analyze the opcodes and generate a color coded representation of instructions within the binary file. For generating the color coded representation, the opcode analyser 310 may divide the instructions into four categories. A color code may be assigned to each category and then shades of the color may be assigned to instructions within the category.

For example, a green color may be assigned to a category of arithmetic and logic instructions, a dark green shade may be assigned to an add instruction and a light shade may be assigned to a subtraction instruction. Therefore, the color coded representation of the instruction may have the dark green and the light green next to each other as representation for the arithmetic and logic instructions. In an example, a hash function may be used to generate the color code for each category of instructions. The color coded representation obtained for all the instructions is referred to as the heat map. In other examples of a heat map, other mechanisms for identifying the instructions may be used.

Referring to FIG. 2, the malware classifier 120 may create a model, such as a deep learning model for further analysis of the binary file. In an example, the malware classifier 120 may generate a confidence score for the binary file after the further analysis to determine whether the binary file has malware or goodware. If the confidence score is high then the binary file may be determined to have one of malware and goodware. Upon determining that the binary file has malware, the binary file may be analyzed based on clustering techniques. Thereafter, a type of malware may be detected in the binary file.

In an example, if the confidence score is low then the binary file may be subjected to dynamic analysis. The dynamic analysis may be performed based on a third subset of features. The third subset of features may be dynamic features, for instance, opcodes of the binary file that may be fetched during runtime execution of the binary file. These dynamic features may be more relevant in determining type of malware in the binary file. In an example, the feature selector 110 may select the third subset of features for the binary file. The dynamic analyzer 210 may then analyze the third subset of features to determine malware. Thereafter, the machine learning cluster 205 may apply clustering technique to determine the type of malware present in the binary file.

Figure 4:
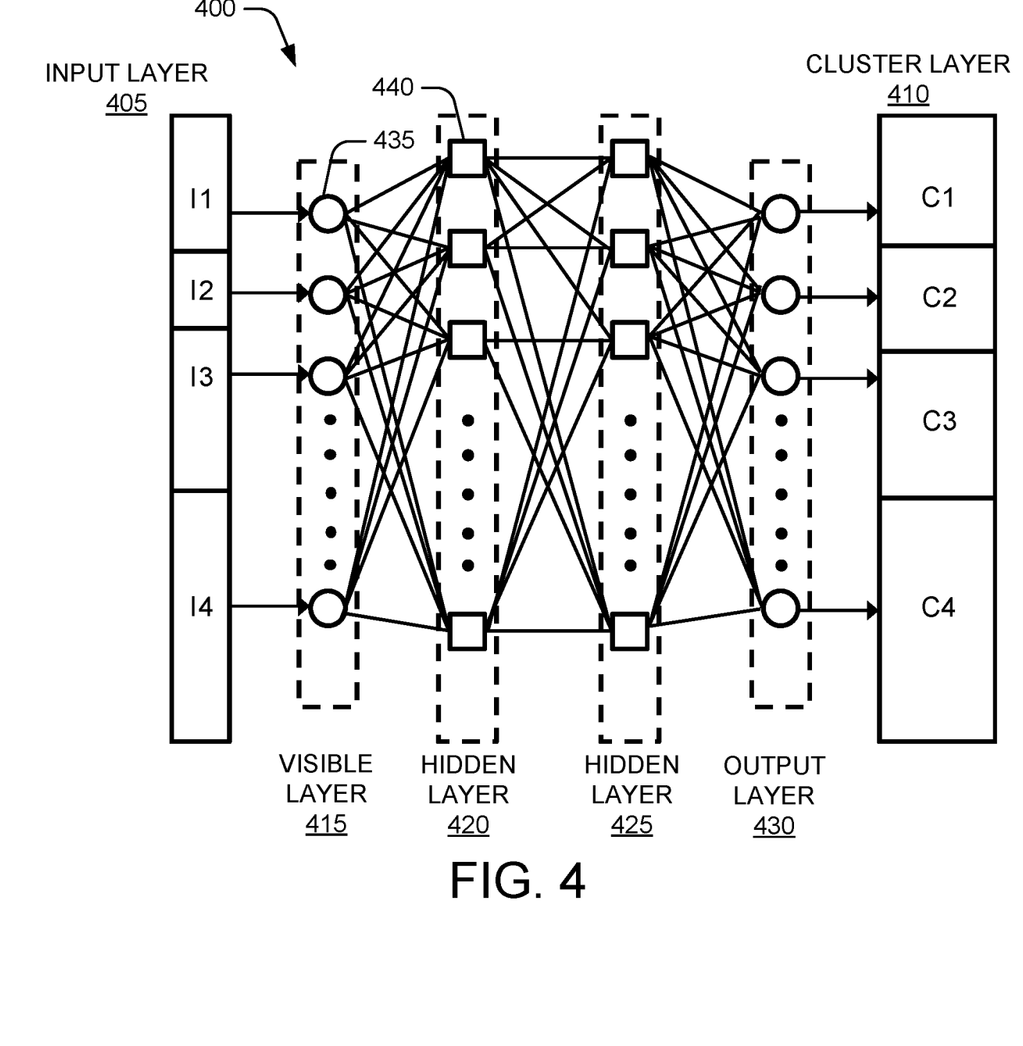
FIG. 4 illustrates a model to detect malware, according to an example embodiment of the present disclosure.

FIG. 4 illustrates a model 400 to detect malware, according to an example embodiment of the present disclosure. The model 400 includes multiple layers, such as an input layer 405 to receive features of the binary file as input, a cluster layer 410 where an output, as to type of malware may be obtained. Further, the model 400 may include other layers, such as a visible layer 415, two hidden layers 420 and 425, and an output layer 430. Each layer may include multiple neurons 435 and 440 and each neuron of a layer may be connected to at least one neuron of the other layer. The model 400 enables an operation of feature slicing wherein the efficiency of processing the binary file for detection of malware may be enhanced.

In an example embodiment of the present disclosure, a subset of features is provided to the input layer 405. For instance, the features 11, 12, 13 and 14 may be provided to the input layer 405. The subset of features may be processed at the visible layer 415 and then may be processed at a subsequent layer, such as the hidden layer 420. The subset of features may then be processed at the hidden layer 425. In an example, when the subset of features may be processed at the hidden layer 420, then another subset of features of another binary file may be processed at the visible layer 415 and accordingly when the subset of features is processed at the hidden layer 425, the other subset of features may be processed at the visible layer 415. In a similar manner, when the other subset of features is processed at the hidden layer 420, yet another subset of features of yet another binary file may be processed at the visible layer 415. In this manner, features of multiple binary files may be processed in parallel by the model 400. In one example, a data dependency graph may be drawn to determine a path of processing for each binary file. Thereafter, each binary file may be processed in parallel as per the path.

The model 400 enhances the classification for a batch of binary files when there are multiple binary files to process. The parallel processing enhances speed optimization and leverages analysis of same features for multiple binary files at the same time.

Figure 5:
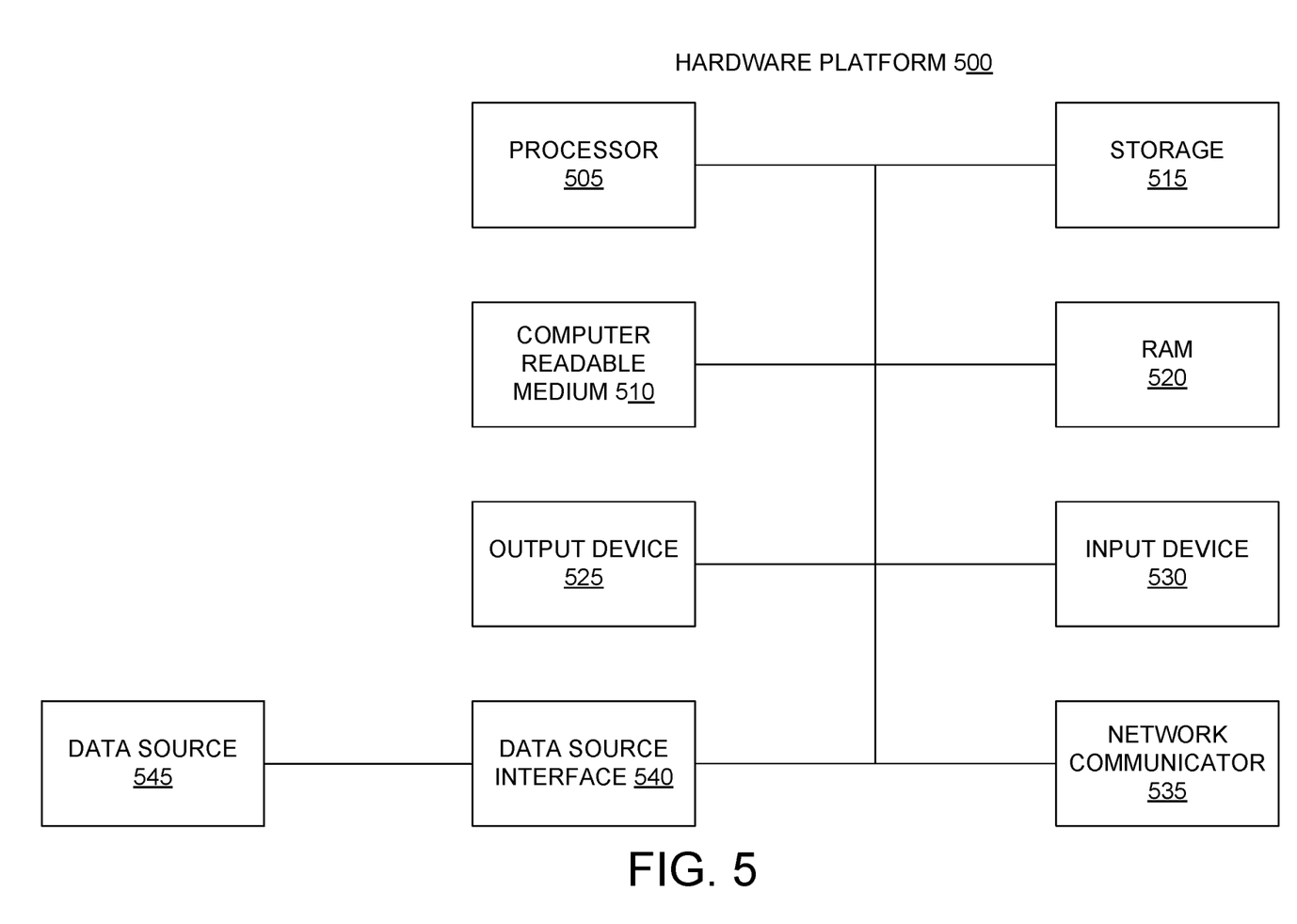
FIG. 5 illustrates a hardware platform, according to an example embodiment of the present disclosure.

FIG. 5 illustrates a hardware platform 500 for embodiment of the system 100, according to an example embodiment of the present disclosure. Particularly, computing machines such as but not limited to internal/external server clusters, quantum computers, desktops, laptops, smartphones, tablets and wearables which may be used to execute the system 100 or may have the structure of the hardware platform 500. The hardware platform 500 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over the FIG. 5, the hardware platform 500 may be a computer system 500 that may be used with the examples described herein. The computer system 500 may represent a computational platform that includes components that may be in a server or another computer system. The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 500 may include a processor 505 that executes software instructions or code stored on a non-transitory computer readable storage medium 510 to perform methods of the present disclosure. The software code includes, for example, instructions to detect an issue and forward the issue for processing, collect data from other employees and teams, analyze the data to determine a solution for the issue and provide the solution to the employee.

The instructions on the computer readable storage medium 510 are read and stored the instructions in storage 515 or in random access memory (RAM) 520. The storage 515 provides a large space for keeping static data where at least some instructions could be stored for later execution. The stored instructions may be further compiled to generate other representations of the instructions and dynamically stored in the RAM 520. The processor 505 reads instructions from the RAM 520 and performs actions as instructed.

The computer system 500 further includes an output device 525 to provide at least some of the results of the execution as output including, but not limited to, visual information to the employees about the solution and response to their query. The output device 525 can include a display on computing devices and virtual reality glasses. For example, the display can be a mobile phone screen or a laptop screen. GUIs and/or text are presented as an output on the display screen. The computer system 500 further includes input device 530 to provide a user or another device with mechanisms for entering data and/or otherwise interact with the computer system 500. The input device may include, for example, a keyboard, a keypad, a mouse, or a touchscreen. In an example, output of a bot is displayed on the output device 525. Each of these output devices 525 and input devices 530 could be joined by one or more additional peripherals.

A network communicator 535 may be provided to connect the computer system 500 to a network and in turn to other devices connected to the network including other clients, servers, data stores, and interfaces, for instance. The network communicator 535 may include, for example, a network adapter such as a LAN adapter or a wireless adapter. The computer system 500 includes a data source interface 540 to access data source 545. A data source is an information resource. As an example, a database of exceptions and rules may be a data source. Moreover, knowledge repositories and curated data may be other examples of data sources.

Figure 6:
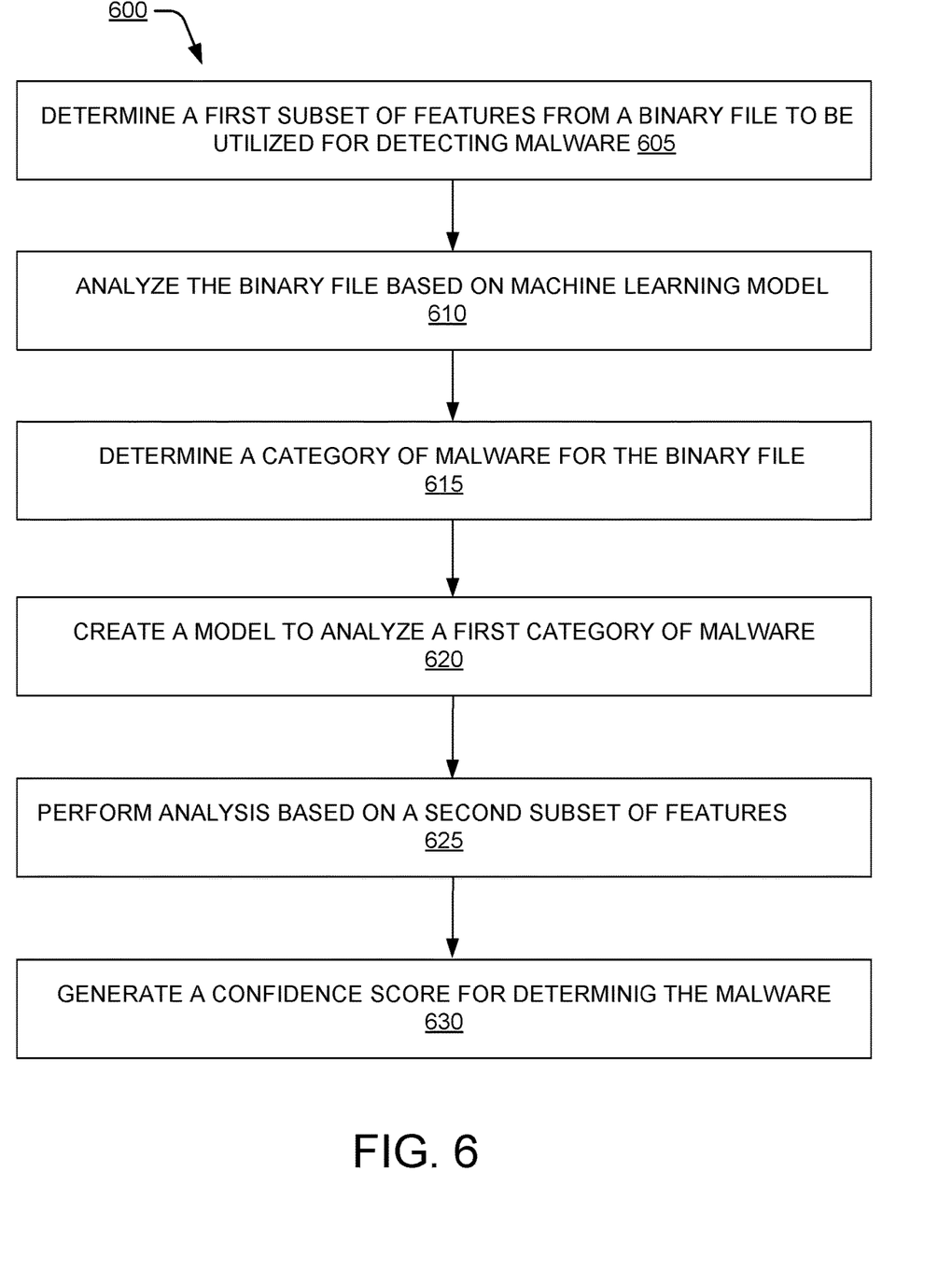
FIG. 6 illustrates a method for detecting malware for a binary file, according to an example embodiment of the present disclosure.
Figure 7:
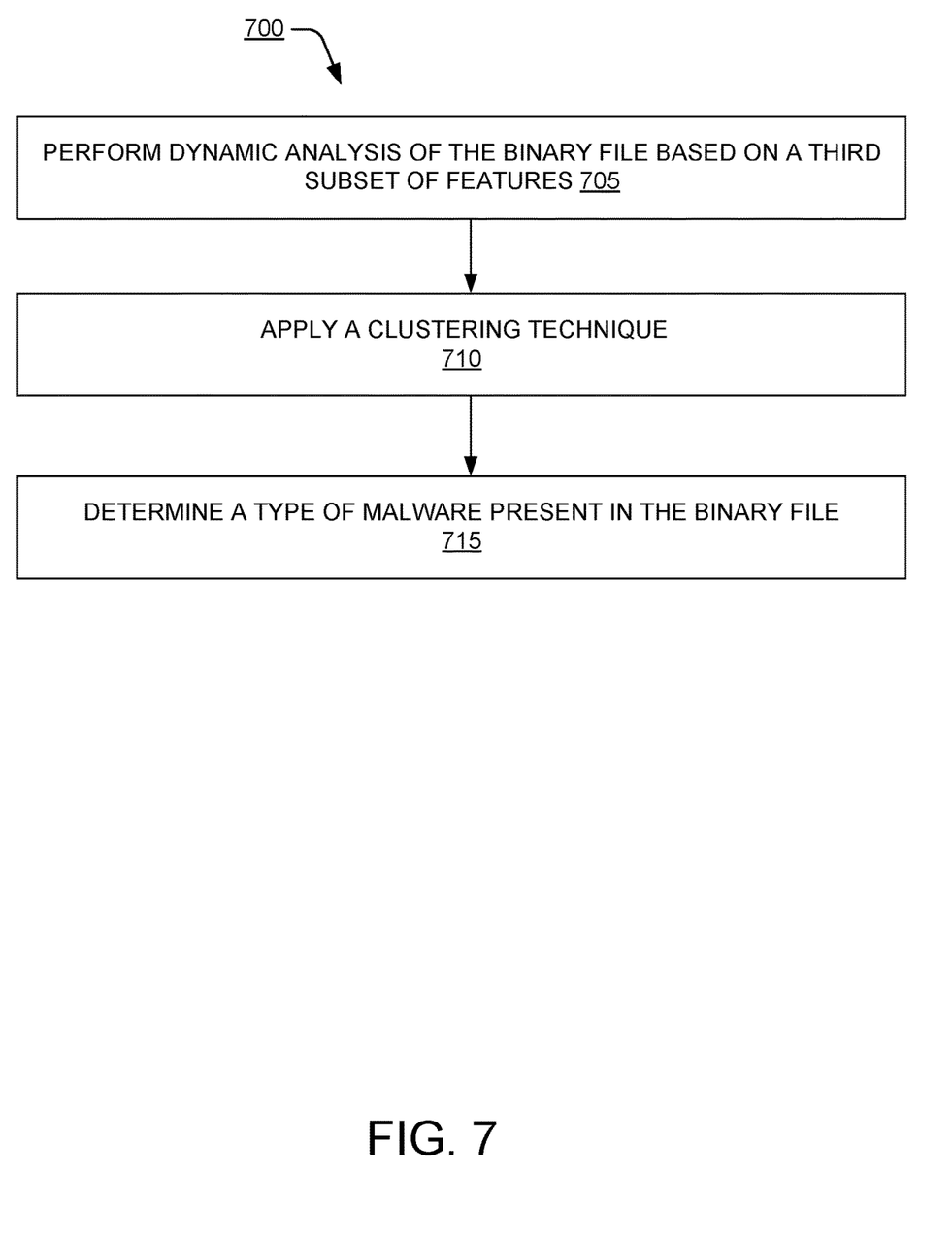
FIG. 7 illustrates a method for performing dynamic analysis of the binary file to determine a type of malware, according to an example embodiment of the present disclosure.
Figure 8:
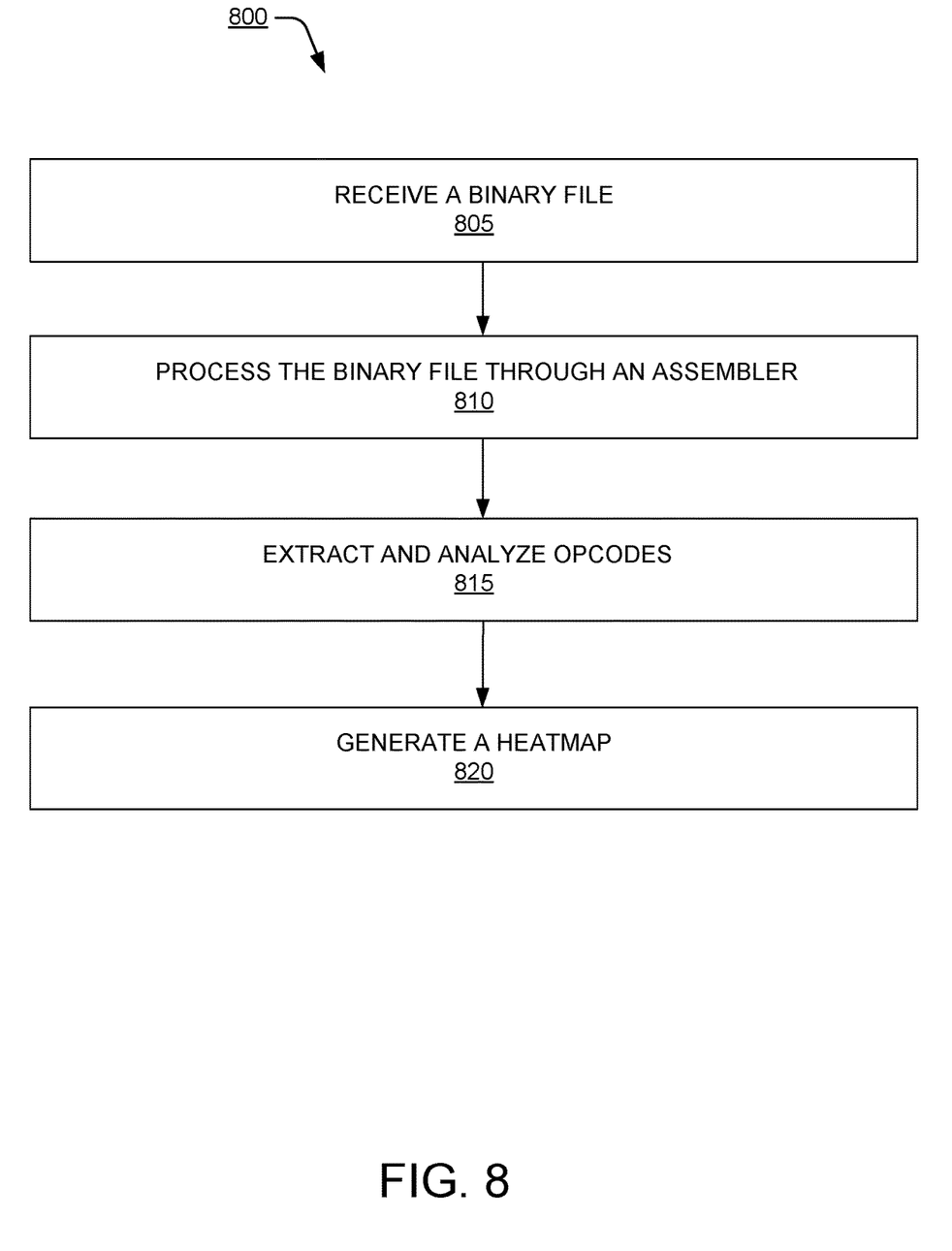
FIG. 8 illustrates a method for generating a heat map, according to an example embodiment of the present disclosure.
Figure 9:
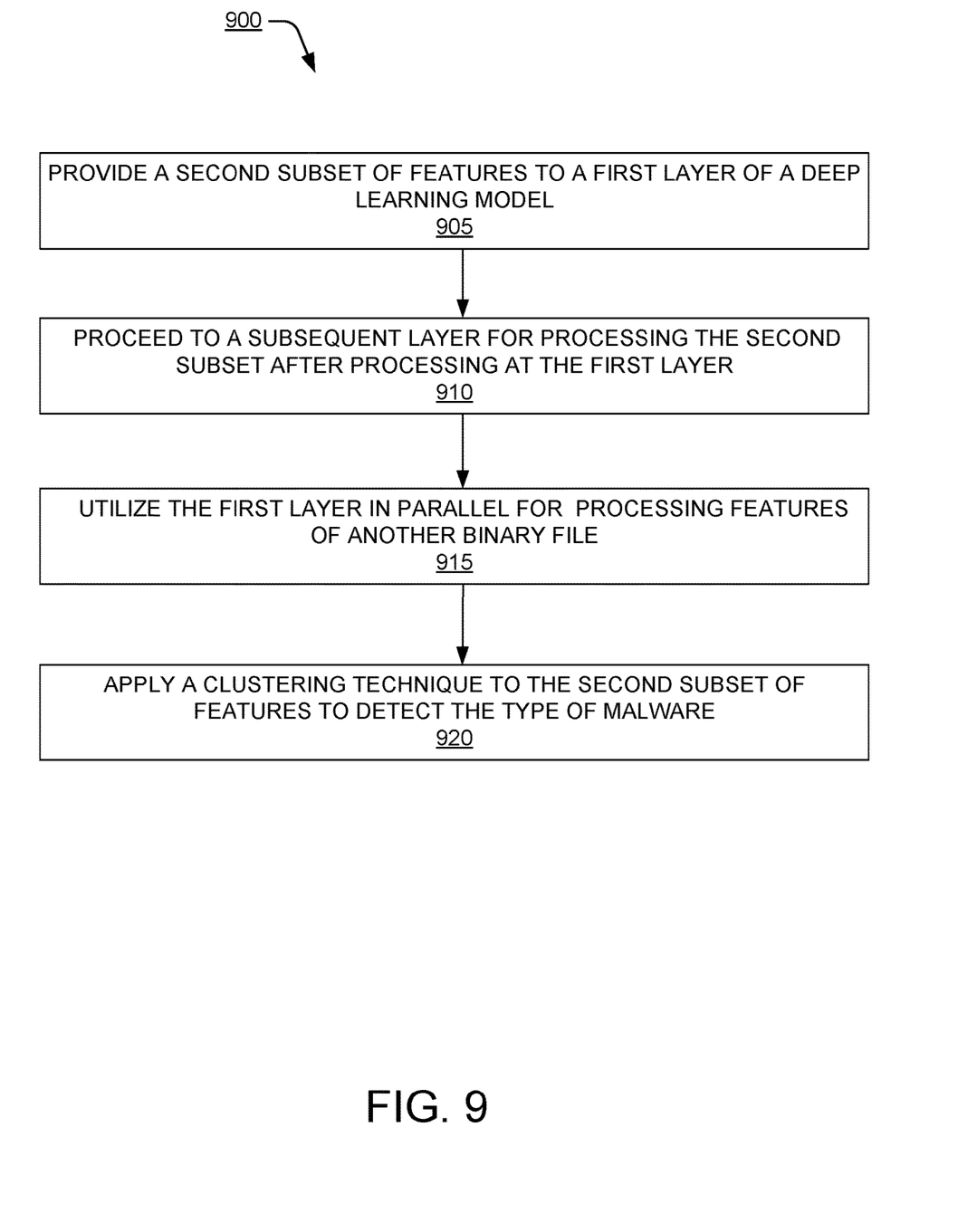
FIG. 9 illustrates a method for applying clustering techniques on the binary file to detect malware, according to an example embodiment of the present disclosure.

FIG. 6 shows a method 600 for detecting malware in a binary file, FIG. 7 shows a method 700 for performing dynamic analysis of the binary file, FIG. 8 shows a method 800 for generating a heat map, and FIG. 9 shows a method 900 for applying a clustering technique to detect malware.

It should be understood that method steps are shown here for reference only and other combination of the steps may be possible. Further, the methods 600, 700, 800 and 900 may contain some steps in addition to the steps shown in the FIG. 6, FIG. 7, FIG. 8, and FIG. 9, respectively. For the sake of brevity, construction and operational features of the system 100 which are explained in detail in the description of FIG. 1, FIG. 2, FIG. 3, FIG. 4, and FIG. 5 are not explained in detail in the description of FIG. 6, FIG. 7, FIG. 8, and FIG. 9. The methods 600, 700, 800, and 900 may be performed by components of the system 100.

At block 605, a first subset of features may be determined for a binary file. The first subset of features may be utilized for detecting malware. The binary file may be indicative of the code having multiple instructions. In an example, the feature selector 110 may determine the first subset of features for malware detection. At block 610, the binary file may be analyzed based on a machine learning model. The malware analyzer 115 may analyze the binary file based on the machine learning model. Thereafter, at block 615, a category of malware may be determined. In an example, the category may include cybercrime or cyber espionage. In an example, the cybercrime may be easily detected based on the binary file. In one example, malware analyzer 115 may determine the category of malware for the binary file. At block 620, a model may be created for the binary file. The model may be created by malware classifier 120 and may be a deep learning model. The model may be created for the first category of malware.

In an example embodiment of the present disclosure, analysis may be performed based on a second subset of features. The analysis may be performed by malware classifier 120 based on the model. A confidence score may be generated for the analysis. In one example, malware classifier 120 may generate the confidence score for the analysis. The confidence score may be indicative of certainty of the analysis performed by malware classifier 120. A high confidence score may therefore represent a certainty of either a goodware or presence of malware in the binary file.

FIG. 7 illustrates the method 700 for performing dynamic analysis on a binary file, according to an example embodiment of the present disclosure. Referring to block 705, a dynamic analysis of the binary file may be performed based on a third subset of features. The third subset of features may be selected from dynamic features of the binary file during runtime execution of the binary file. In an example embodiment, malware classifier 120 may perform the dynamic analysis of the binary file based on the third subset of features. At block 710, a clustering technique may be applied to the binary file. The clustering technique may be applied when a bit pattern may appear in the binary file to be similar to any malware stored in a database 125. In an example, the machine learning cluster 205 may apply the clustering technique to the binary file.

Thereafter, at block 715, a type of malware may be determined. The type of malware may be determined based on the clustering technique applied to the binary file. In an example, the type of malware determined may then be stored in the database 125 and may be used for training malware detection systems, such as malware detection system 100. The information stored in the database 125 may then be used to compare bit patterns in subsequent binary files and determine presence of malware in the binary files.

FIG. 8 illustrates the method 800 for generating a heat map for the binary file, according to an example embodiment of the present disclosure. At block 805, a binary file may be received. The binary file may be indicative of a code that is to be analyzed for having malwares. Thereafter, the binary file may be processed based on an assembler at block 805. In an example embodiment, an assembler 305 may process the binary file. The assembler 305 may determine the opcodes for the binary file. After the opcodes have been determined, the opcodes may be extracted and analyzed at block 815. In an example, the opcode analyzer 310 may analyze the opcodes of the binary file.

Thereafter, at block 820 a may be generated for the binary file. The heat map may be, for example, a color coded representation of the instructions in the binary file to aid in determining and detecting malware. In one example, the heat map generator 315 may generate the heat map for the binary file.

FIG. 9 illustrates the method 900 for applying a clustering technique on a second subset of features of the binary file, according to an example embodiment of the present disclosure. At block 905, a second subset of features may be provided to a first layer of a deep learning model. The deep learning model may include multiple layers with each layer having multiple neurons for processing the second subset of features. The second subset of features may be selected from multiple features of the binary file based on relevance in determining malware. In an example, the second subset of features may be processed at the visible layer 415 of the deep learning model 400. After processing the second subset of features at the first layer, the second subset of features may be processed at a second layer of the model. In an example, the second subset of features may be processed at the hidden layer 420 of the model by malware classifier 120.

At block 915, the first layer of the model may be utilized for processing features of another binary file in parallel. In one example, when the second subset of features is being processed at the second layer of the model, the features of the other binary file may be processed at the first layer concurrently. In a similar manner, when the second subset of features may be processed at a third layer, then the features of the other binary file may be processed at the second layer, and features of the yet another binary file may be processed at the first layer of the model. In this manner multiple features of multiple binary files may be processed at the same time thereby enhancing the speed of detecting malwares.

Thereafter at block 920, a clustering technique may be applied on the second subset of features to detect type of malware. In an example, the machine learning cluster 205 may apply the clustering technique to the binary file to determine the type of malware present in the binary file.

The described method and system provide time and resource efficient techniques to detect malwares in binary files thereby enhancing speed of detection of malwares with accuracy and scalability and aid in faster discovery and training for such malwares. Further, the described techniques reduce labour cost and the operational cost involved in detecting malwares.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A Malware Detection System (MDS), comprising:
a hardware processor;
a feature selector, coupled to the processor, to determine a first subset of features from amongst multiple features of a binary file to be utilized for detecting malware, wherein the binary file is indicative of a code and the first subset of features is selected based on applicability for detecting malware;
a malware analyzer, coupled to the processor, to:
analyze the binary file based on a machine learning model and the first subset of features; and
determine one of a first category of malware and a second category of malware for the binary file based on a degree of detectability of malware within the binary file, wherein the first category of malware has a lower detectability than the second category of malware, the degree of detectability being determined by the machine learning model trained based on previous malwares and bit patterns within previous binary files; and
a malware classifier, coupled to the processor, to:
create a model to analyze the first category of malware;
perform analysis of the first category of malware based on a second subset of features, the second subset of features being extracted from amongst the multiple features of the binary file by the feature selector and is different from the first subset of features; and
generate a confidence score for determining malware, wherein malware is determined in response to the confidence score exceeding a threshold value.

2. The MDS as claimed in claim 1, comprising a pattern matcher, coupled to the processor, to:
receive the binary file for detection of malware;
determine a pattern of bits in the binary file;
compare the pattern of bits with stored patterns of bits of the previous binary files, wherein each stored pattern of bits is associated with malware; and
provide the binary file to the machine learning model for determining the first subset of features in response to a mismatch between the pattern of bits and the stored patterns of bits.

3. The MDS as claimed in claim 1, wherein the malware classifier is to further:
perform a dynamic analysis of the binary file based on a third subset of features, when the confidence score is below the threshold value, the third subset of features being selected by the feature selector based on a runtime execution of the binary file; and
apply a clustering technique to determine a type of malware present in the binary file.

4. The MDS as claimed in claim 1, wherein malware classifier is to create the model based on a deep learning technique, the model having multiple layers for processing and each layer having multiple neurons, wherein at least one neuron of one layer is connected to at least one neuron of another layer.

5. The MDS as claimed in claim 4, wherein the malware classifier is to:
feed the second subset of features to a first layer of the model from amongst the multiple layers;
proceed to a subsequent layer in the model for processing the second subset of features upon processing at the first layer, wherein the first layer is utilized in parallel for processing features of another binary file; and
apply a clustering technique to the second subset of features to detect a type of malware in the binary file.

6. The MDS as claimed in claim 1, wherein the first category of malware includes malwares relating to cyber espionage and the second category of malware includes malwares relating to cybercrime.

7. The MDS as claimed in claim 1, wherein the malware analyzer is to, detect the first category and the second category of malware based on a Shannon entropy of the binary file, the Shannon entropy being indicative of repetition of bit patterns within the binary file.

8. The MDS as claimed in claim 1, wherein the second subset of features include opcodes of the code and are provided to the model as a heat map, the heat map being indicative of a color representation of instructions within the opcodes in an interpretable manner for the model.

9. A method comprising:
determining a first subset of features from amongst multiple features of a binary file to be utilized for detecting malware, wherein the binary file is indicative of a code and the first subset of features is selected based on applicability for detecting malware;
analyzing the binary file based on a machine learning model and the first subset of features;
determining one of a first category of malware and a second category of malware for the binary file based on a degree of detectability of malware within the binary file, wherein the first category of malware has a lower detectability than the second category of malware, the degree of detectability being determined by the machine learning model trained based on previous malwares and bit patterns within previous binary files;

creating a model to analyze the first category of malware;

analyzing the first category of malware based on a second subset of features, the second subset of features being extracted from amongst the multiple features of the binary file and is different from the first subset of features; and generating a confidence score for determining malware, wherein malware is determined in response to the confidence score exceeding a threshold value.

10. The method as claimed in claim 9 further comprising:

receiving the binary file for detection of malware;

determining a pattern of bits in the binary file;

comparing the pattern of bits with stored patterns of bits of the previous binary files, wherein each stored pattern of bits is associated with malware; and providing the binary file to the machine learning model for determining the first subset of features in response to a mismatch between the pattern of bits and the stored patterns of bits.

11. The method as claimed in claim 9 further comprising:

performing a dynamic analysis of the binary file based on a third subset of features in response to the confidence score below the threshold value, the third subset of features being selected based on a runtime execution of the binary file; and applying a clustering technique to determine a type of malware present in the binary file.

12. The method as claimed in claim 9, wherein the model is created based on a deep learning technique, the model having multiple layers for processing and each layer having multiple neurons, wherein at least one neuron of one layer is connected to at least one neuron of another layer.

13. The method as claimed in claim 9, wherein the first category of malware includes malwares relating to cyber espionage and the second category of malware includes malwares relating to cybercrime.

14. The method as claimed in claim 9, wherein the first category of malware and the second category of malware are detected based on a Shannon entropy of the binary file, the Shannon entropy being indicative of repetition of bit patterns within the binary file.

15. The method as claimed in claim 9, wherein the second subset of features include opcodes of the code and are provided to the model as a heat map, the heat map being indicative of a color representation of instructions within the opcodes in an interpretable manner for the model.

16. A non-transitory computer readable medium including machine readable instructions that are executable by a processor to:

determine a first subset of features from amongst multiple features of a binary file to be utilized for detecting malware, wherein the binary file is indicative of a code and the first subset of features is selected based on applicability for detecting malware;

analyze the binary file based on a machine learning model and the first subset of features;

determine one of a first category of malware and a second category of malware for the binary file based on a degree of detectability of malware within the binary file, wherein the first category of malware has a lower detectability than the second category of malware, the degree of detectability being determined by the machine learning model trained based on previous malwares and bit patterns within previous binary files;

create a model to analyze the first category of malware;

perform analysis of the first category of malware based on a second subset of features, the second subset of features being extracted from amongst the multiple features of the binary file and is different from the first subset of features; and generate a confidence score for determining malware, wherein malware is determined in response to the confidence score exceeding a threshold value.

17. The non-transitory computer readable medium as claimed in claim 16, wherein the processor is to:

receive the binary file for detection of malware;

determine a pattern of bits in the binary file;

compare the pattern of bits with stored patterns of bits of the previous binary files, wherein each stored pattern of bits is associated with malware; and provide the binary file for determining the first subset of features in response to a mismatch between the pattern of bits and the stored patterns of bits.

18. The non-transitory computer readable medium as claimed in claim 16, wherein the processor is to:

perform a dynamic analysis of the binary file based on a third subset of features in response to the confidence score below the threshold value, the third subset of features being selected based on a runtime execution of the binary file; and apply a clustering technique to determine a type of malware present in the binary file.

19. The non-transitory computer readable medium as claimed in claim 16, wherein the processor is to create the model based on a deep learning technique, the model having multiple layers for processing and each layer having multiple neurons, wherein at least one neuron of one layer is connected to at least one neuron of another layer.

20. The non-transitory computer readable medium as claimed in claim 16, wherein the processor is to detect the first category and the second category of malware based on a Shannon entropy of the binary file, the Shannon entropy being indicative of repetition of bit patterns within the binary file.

* * * * *